Jan. 22, 1929.　　　　　　　　　　　　　　　　　1,699,812
J. D. SARTAKOFF
LIQUID LEVEL INDICATING SYSTEM
Filed June 29, 1926　　　3 Sheets-Sheet 1

INVENTOR.
Jack D. Sartakoff
BY Cornelius Zaluske
ATTORNEYS.

Jan. 22, 1929.  
J. D. SARTAKOFF  
1,699,812  
LIQUID LEVEL INDICATING SYSTEM  
Filed June 29, 1926 3 Sheets-Sheet 2

INVENTOR,  
Jack D. Sartakoff  
BY  
ATTORNEYS.

Jan. 22, 1929.　　　　　J. D. SARTAKOFF　　　　　1,699,812
LIQUID LEVEL INDICATING SYSTEM
Filed June 29, 1926　　　3 Sheets-Sheet 3

INVENTOR.
Jack D. Sartakoff
BY
ATTORNEYS.

Patented Jan. 22, 1929.

1,699,812

UNITED STATES PATENT OFFICE.

JACK D. SARTAKOFF, OF NEW YORK, N. Y., ASSIGNOR, BY MESNE ASSIGNMENTS, OF ONE-HALF TO KHETAH CORPORATION, OF NEW YORK, N. Y., A CORPORATION OF NEW YORK.

LIQUID-LEVEL-INDICATING SYSTEM.

Application filed June 29, 1926. Serial No. 119,307.

This invention relates to indicating systems, and more particularly those for indicating the level or quantity of liquid in tanks and other vessels at points remote from the vessels containing such liquids.

The invention is adapted to be used in connection with the measurement of any liquid, but is particularly intended for use in the measuring of gasoline contained within the underground supply tanks in garages, filling stations, etc. The invention is not, however, limited to use with underground storage tanks, but is adapted for broad general application.

The object of the invention is to provide simple and reliable measuring or indicating apparatus adapted to be positioned at a distance from the liquids to be measured and susceptible of installation in an office of the garage, factory or filling station, so that the person in charge may readily ascertain the amount of liquid in the tank or tanks forming part of the system without recourse to measuring sticks and other similar adjuncts.

An important feature of the present invention resides in the fact that the system may be associated with tanks from which liquid is adapted to be drawn by a pump or forced by hydraulic or pneumatic pressure.

A further important feature of the invention consists in means forming part of the system for showing the temperature of the liquid drawn from the tank.

In one of its preferred practical forms, the invention embodies two vessels which are relatively movable and are preferably connected at their bases by a flexible tube which together with the vessels constitutes a flexible U tube. The U tube contains mercury or any other suitable heavy liquid which in the operation of the apparatus functions as a mobile piston. One arm of the U tube is connected to a bell or air pressure cylinder positioned within a tank and at least partially submerged in the liquid to be measured. The other arm of the U tube is vented and is also connected to the first arm of the U tube by a tube in which is interposed a trap or liquid valve embodying a reading column and functioning as a safety valve and also an indicating element.

The vessel associated with the said first arm of the U tube is provided interiorly with an electrical contact terminal included in a circuit which also includes the bell and a mercury column in the U tube, so that when the mercury column rises in said vessel sufficiently to engage the contact terminal, the circuit will be completed and the bell will ring. This vessel is mounted for regulation in order that accuracy of adjustment may be obtained. The other or second vessel which is associated with the other arm of the U tube is mounted for vertical movement and a pointer cooperating with a suitable dial is operatively connected with the second vessel for synchronized movement therewith.

Through movement of the second vessel variations in pressure may be obtained in the arm of the U tube above the first vessel by the flow of the piston during movement of the second vessel and through this manual movement, the vessels may be relatively adjusted to balance the pressure due to the liquid head in the tank against the weight of the piston and when the piston has been brought into a position to complete the electric circuit, the pointer will show on the dial the level or amount of liquid in the tank, it being understood that the dial is graduated to permit of such reading. During these operations, the safety valve will function to relieve excess pressures.

It will thus be noted that the present invention embodies, among other features, a flexible U tube adapted for manual manipulation to cause the flow of a mobile piston contained therein and during which manipulation a pointer is automatically moved over a dial to permit readings to be made when the pressures are properly balanced.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1:
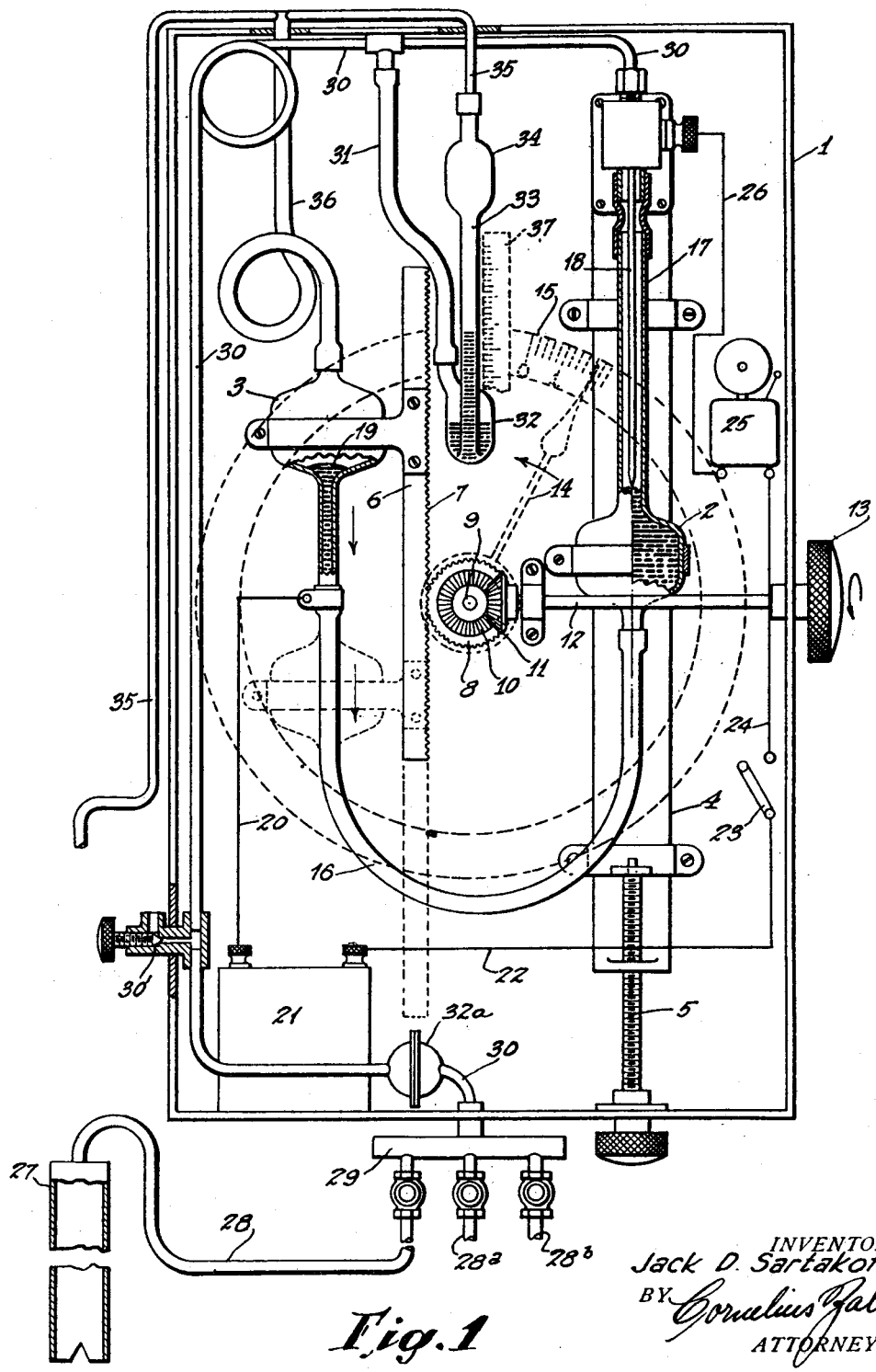
Figure 1 is a diagrammatic showing of an indicating system embodying the present invention. In this view, the tank with which the system is to be associated is not shown.

Referring to the drawings, 1 designates a suitable casing or housing in which the operating parts of the apparatus are contained. Mounted within the casing are two vessels 2 and 3. The vessel 2 is supported on a plate 4 mounted for vertical sliding adjustment adapted to be imparted thereto by an adjusting screw 5. Normally, however, the vessel 2 is stationary and may be referred to as the fixed vessel.

The vessel 3 is mounted upon a carrier 6 supported for vertical sliding movement and provided at one edge with a rack 7, whereby the carrier may be reciprocated vertically to correspondingly move the vessel 3. This vessel, because of the movement to which it is adapted may be termed the movable vessel.

Meshing with the rack 7 is a pinion 8 fixed on a spindle 9 to which is also secured a bevel gear 10. Meshing with this bevel gear is a bevel pinion 11 fixed on a shaft 12 which projects through the side of the casing and has affixed thereto a hand wheel or finger piece 13 by means of which the shaft 12 may be rotated to impart vertical movement to the carrier 6. Also fixed on the shaft 9 is a hand or pointer 14 which works over a dial 15 in a manner hereinafter more fully explained.

The vessels 2 and 3 are provided with depending nipples which are connected by a flexible tube 16 and the vessel 2 is formed with an upwardly extending neck 17, downwardly through which extends a rod 18 which terminates at about the base of the neck. The vessels 2 and 3 and their connecting tube 16 collectively form a U tube substantially the opposite ends of which are enlarged to form the vessels 2 and 3. This U tube contains mercury or some other suitable heavy liquid 19 which constitutes part of an electric circuit. The mercury body is connected by means of a wire 20 to one pole of a battery 21 and a wire 22 leads from the other pole of the battery to the switch 23. From the switch 23, a wire 24 leads to a bell, buzzer, or other audible or visual signal 25 and from the bell 25 a wire 26 leads to electrical connection with the rod 18. It will thus be apparent that if the body of mercury rises in the vessel 2 sufficiently to engage the lower end of the rod 18, an electrical circuit will be completed and the bell will be sounded. The circuit will be again broken when the mercury level falls in the vessel 2 below the end of the rod.

In associating the present invention with a tank, I provide a bell or pressure cylinder 27 which is adapted to be positioned in the tank, the contents of which is to be measured. This pressure cylinder is open at its bottom and closed at its top except for a tube 28 which leads from the top of said chamber to and is connected with the upper end of the neck 17 of the vessel 2. This tube may extend in a substantially uninterrupted manner from the pressure cylinder 27 to the neck 17, but in Figure 1, it is shown as extending to a header 29 to which are connected numerous other pipes 28$^a$, 28$^b$, etc., corresponding to other pressure cylinders or pressure bells associated either with the same tank or with different tanks. All of the pipes 28$^a$, 28$^b$, are valved so that they may be selectively placed in communication with the header 29. The header 29 is connected by a pipe 30 to the upper end of the neck 17, but in this pipe is included a vent valve 30′ whereby the interior of the pipe may be vented to the outer atmosphere.

I may also include in this pipe a protecting element 32$^a$ consisting of a casing having a wire gauze partition therein to preclude a flash back in case gases in the pipe 30 catch fire above the protector 32$^a$. In practice this protector 32$^a$ functions similarly to the Davy lamp principle.

It will be noted that the pipe 30 is also connected by a tube 31 to a glass vessel 32 into the lower portion of which extends the depending neck 33 of a second glass vessel 34. Mercury or any other suitable indicating liquid is contained within the vessel 32 and under varying degrees of pressure, as hereinafter explained, will rise in the neck 33. The glass vessel 34 has a vent pipe 35 which leads to the atmosphere and to this vent pipe is also connected a flexible tube 36 leading to the upper end of the movable vessel 3. It will be noted that a graduated scale 37 is associated with the neck 33 of the glass tube 34.

Figure 2:
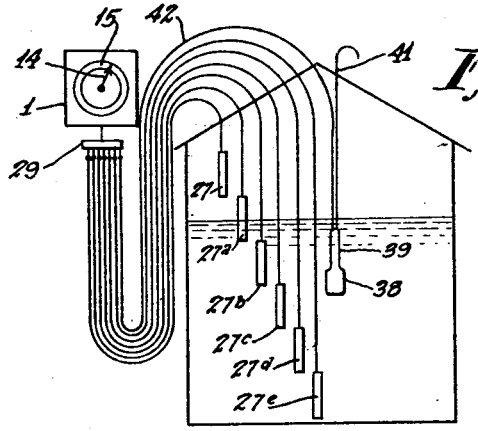
Figure 2 is a diagrammatic view showing the system illustrated in Figure 1, as applied to a tank of large capacity.

When installing the present invention in a tank, the particular method of installation will vary with the size of the tank. For relatively small supply tanks, such, for example, as are ordinarily used at filling stations, a single pressure cylinder 27 of a length substantially equal to the interior height of the tank is positioned within the tank. In the larger tanks, however, an arrangement, such as is shown in Figure 2 is generally employed. Here a plurality of pressure cylinders 27, 27$^a$, 27$^b$, 27$^c$ and 27$^d$ are positioned at different elevations in the tank with the bottom of the successive cylinders juxtaposed with the top of the next preceding cylinder, so that, collectively, the several cylinders will cover the entire range of liquid levels in the tank. Pipes 28 lead from the several pressure cylinders to the header 29 and by opening the valves of the respective pipes in succession, an accurate reading of the liquid level can be obtained as will be hereinafter more fully explained. Suffice it here to say that the purpose of the header 29 is to allow unitary indicating means to serve a plurality of pressure cylinders either in the same or in different tanks.

After initial installation of the parts as thus far described, the apparatus operates as follows. When it is desired to take a reading, the knob or hand wheel 13 is turned in a counterclockwise direction to turn the dial pointer 14 counterclockwise and at the same time move the vessel 3 downward with its carrier 6, until it takes substantially the dotted line position of Figure 1. Mercury 19, which ordinarily substantially half fills both the vessels 2 and 3, is thereby caused to gravitate from the vessel 2 in the direction of the vessel 3. This recession of the mercury level in the vessel 2 creates a partial vacuum in the neck 17. This partial vacuum causes air to be sucked in through the pipe 30 and through the tube 31 from the small vessel 32 and such air enters the vessel 32 through the pipe 35 and neck 33 and bubbles up through the liquid in the vessel 32 to pass through the tube 31 and pipe 30 into the neck 17.

This operation can be seen by watching the glass vessel 32 and the neck 33, since it is accompanied by a pronounced agitation of the liquid therein due to the bubbling of the air through the liquid. After the bubbling has ceased, and, in practice, it ceases in a fraction of a minute, the knob 13 is turned clockwise. This elevates the vessel 3 and causes the mercury to run from such vessel toward the vessel 2 with the result that the air in the neck 17 and in the pipes 30 and 28 will be placed under pressure. This pressure will also be communicated to the glass vessel 32 and will cause the mercury to rise in the neck 33, but such pressure is not sufficient to cause air bubbles to pass from the vessel 32 through the column of mercury in the neck 33.

Corresponding pressure, however, is built up in the pressure cylinder 27 and forces the liquid in such pressure cylinder out of the bottom thereof, superfluous pressure being forced out through the liquid in the tank in the form of bubbles. This continues until an equilibrium is established between the pressure in the pressure cylinder 27 and the hydrostatic pressure of the liquid in the tank.

The pressure to which I have referred is built up by the turning of the knob 13 and consequent elevation of the vessel 3. By the time the condition of equilibrium, to which I have referred, has been established the vessel 3 will have been elevated to such extent as to raise the level in the vessel 2, against the pressure in the neck 17, sufficiently to complete a circuit with the rod or electrode 18 and the bell 25 will ring. If the operator thereupon looks at the pointer 14, a reading may be had with reference to the dial 15, and this reading will show the quantity of liquid in the tank.

Moreover, the mercury column in the neck 33 is susceptible of a reading in conjunction with the graduated scale 37 and indicates approximately the level of the liquid in the tank. Any time that an accurate reading is desired, it is only necessary to turn the knob 13 counterclockwise as hereinbefore described and then slowly reverse such rotation until the bell rings whereupon the pointer 14 will indicate the contents of the tank.

It will thus appear that the construction is not only simple and not apt to get out of order, but is extremely accurate. If the connections in the tank are not carefully made and slight leakage is present, this makes very little if any difference, since the invention creates pressure in the neck 17 by means of the difference in the mercury level in the adjustable U tube and if the pressure is leaking slightly, it simply means that it will take a little longer for the mercury to rise sufficiently to close the circuit to the bell. Changes of temperature occurring between the tank and the indicator casing, as well as leaks, in order to effect the reading would have to occur between the time that the bell sounded and the time that the operator could look at the indicating pointer 14, and as these two events are practically simultaneous, the pronounced accuracy of the indication will be apparent.

Since this apparatus in effect, measures distance from the lower end of the rod or electrode 18 to the level of the mercury in the vessel 3 by means of a pointer 14 operating over the scale 15, it necessarily follows that in order to be absolutely accurate, the pointer 14 should be at zero on the scale 15, when the mercury in the vessel 3 is exactly level with the lower end of the electrode 18. This occurs when there is atmospheric pressure in the neck 17 of the vessel 2. In order to check the apparatus at any time to determine its accuracy the valve 30' should be opened to vent the system and permit atmospheric pressure to be established therein.

After this has been done and while the valve 30' is open, the knob 13 should be turned clockwise until the buzzer operates and this should occur exactly as the pointer reaches zero on the scale 15. If there is the slightest discrepancy, corrective adjustment may be made by manipulating the thumb screw 5. Thereafter the valve 30' should be closed and the apparatus is susceptible to correct readings by manipulating the thumb screw in the manner which I have hereinbefore described.

I wish to point out that the parts 32, 33 and 34, the last mentioned of which is vented to the atmosphere, function in practice as a safety valve. For example, if at any time and for any one of many reasons, an undesirable and abnormal pressure may be built up within the pipe 30, this pressure may escape by forcing all of the liquid from the vessel 32 up into the vessel 34, whereupon excess pressure may bubble through this liquid and exit by the pipe 35 without occasioning any damage to the apparatus.

Reference has been made to the construction of Figure 2 and from what has been described with reference to Figure 1, the manner of operating the arrangement of Figure 2 will be clear from this drawing, if it be borne in mind that when operating any particular pressure cylinder, there be added to the resulting dial reading the distance at which the lower edge of such pressure cylinder is from the bottom of the tank. For example, if the reading is being taken by using the pressure cylinder 27ᵃ and the dial reading is, for example, 500 gallons, this simply means that there is 500 gallons above the lower edge of the cylinder 27ᵃ and in order to ascertain the entire contents of the tank, it is only necessary to add that quantity below the lower edge of the cylinder to the dial reading in order to give the complete contents. It can be readily ascertained and in fact marked upon the header or a suitable chart the quantity of liquid below the lower edge of each pressure cylinder, so that in the manner described, accurate measurement may be had of the contents of tanks of almost unlimited size by the use of small, compact indicating means. This is a highly novel feature of the invention.

For the reasons well known to the art, it is desirable when dispensing liquids, e. g., gasoline to know the temperature of the liquid being drawn from the tank. The present invention provides means whereby this can be readily ascertained.

Figure 3:
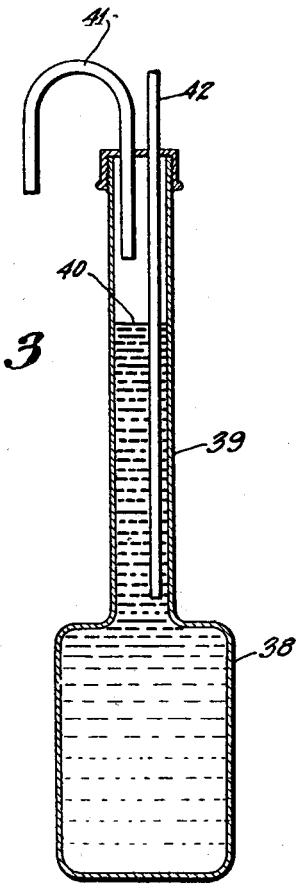
Figure 3 illustrates certain temperature operated means shown diagrammatically in Figure 2.

In Figure 2, means is shown for accomplishing this result and this means is detailed in Figure 3. In these views, 38 is a receptacle having a neck 39 and partly filled with mercury or any other suitable liquid 40. This receptacle is positioned within a tank, as shown at Figure 2, with a vent pipe 41 leading to the atmosphere and a pipe 42 leading to the header 29. The pipe 42 extends down into the neck 39, so that as the level of the liquid 40 rises and falls under changes of temperature, similarly to the operation of the thermometer, this rise and fall in liquid level within the lower end of the pipe 42 will produce variations in air pressure within said pipe and when the corresponding valve is opened to permit communication of such pressure to the pipe 30 of Figure 1. A reading may be taken by manipulation of the knob 13, as hereinbefore described, the dial 15 having a series of graduations to show temperatures as well as volumes.

This will be clearly apparent when it is noted that in the drawing the tube 39 is shown to be of smaller diameter than the tube 38 (see Figure 3). For this reason, level 40 rises and falls with the temperature very rapidly as in a thermometer, the rising being effected by the change of volume of the whole liquid volume not only in 39, but also in 38. It is this change of liquid 40 that is measured by the pressure at the bottom of 42. Obviously, it is not quite proportional to temperature as the specific gravity of the liquid changes somewhat. It is not necessary, however, that strict proportionality be maintained. All that is necessary in practice is to measure the actual pressure at two given extreme temperatures just as is done when calibrating a thermometer. The proper thermometer scale is then found by dividing the difference of readings by the difference of temperatures used for calibration.

Figure 4:
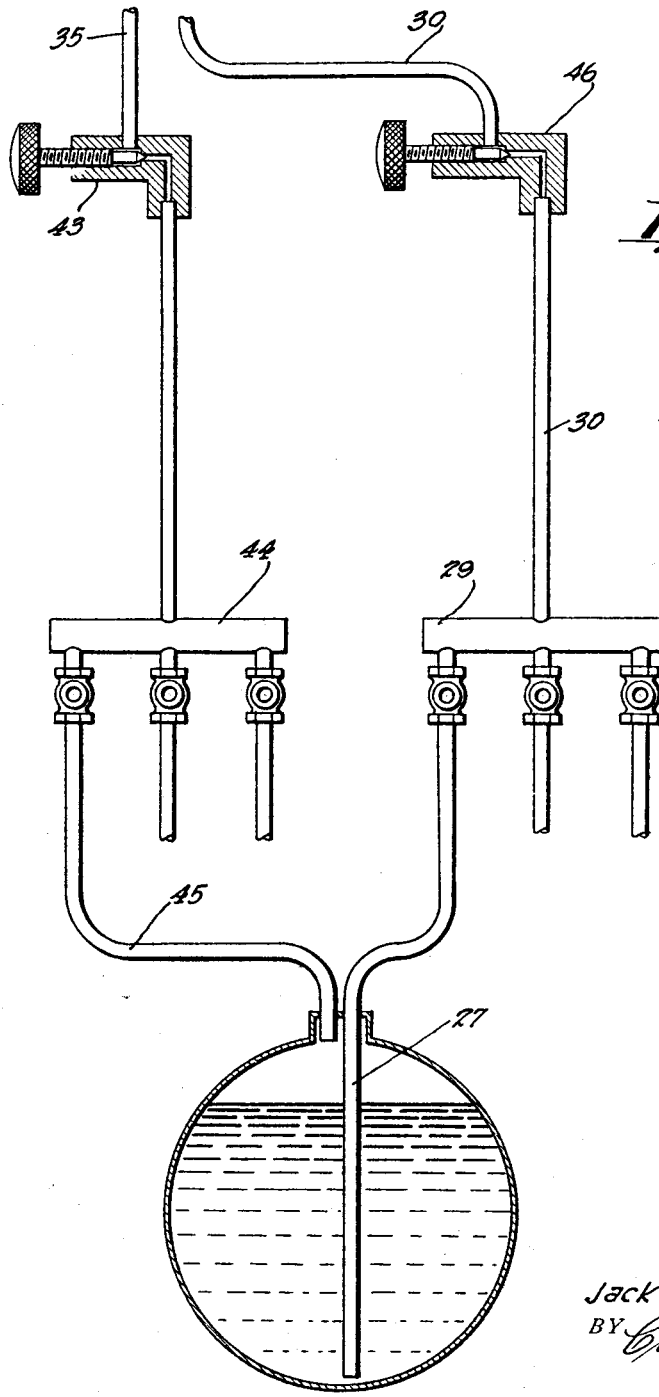
Figure 4 shows the adaptation of the form of the invention shown in Figure 1 to a hydraulic or pressure liquid feed system.

It will further be apparent that I am able with one indicating apparatus to measure tanks of any depth or capacity, to also show the temperature of the liquid. The construction, as thus far described, is particularly adapted for employment for installation with tanks having atmospheric pressure within the tank. In force feed systems, such as pneumatic or hydraulic pressure tanks, a slight modification over the construction shown in Figure 1 should be used as shown in Figure 4. The tank will of course be sealed if it is a pressure feed system and the pipe 35 of Figure 1 should be continued through a suitable shut off valve 43, to a header 44 from which pipes 45 lead to the interior of the tank, so that the pressure within the tank will be communicated to the vessels 3 and 34. The vent valve 30ᵃ should be omitted and in lieu thereof, the pipe 30 should be led through a suitable shut off valve 46 to the header 29, which is connected with pressure cylinders after the manner hereinbefore described.

By thus communicating pressure in the tank to oppose the hydrostatic pressure in the tank and building up operating pressures for the indicating apparatus, accurate readings may be had without the use of springs or other extraneous cushioning means. If the pipe 35 is not connected with the tank, the pressure in the tank would probably force the mercury out of the system or would at any rate so disorganize the apparatus that accurate readings could not be obtained.

I wish to call attention to the practical advantage of the liquid valve embodying the vessels 32 and 34 with the interconnecting neck 33. This constitutes a feature of considerable practical importance. For example, if the valve 30' were left closed while the measuring operation was proceeded with, the lowering of the mercury column in the chamber 2 would produce sufficient suction in the pressure cylinder 27 to, in many instances, draw gasoline into the neck 17. This would particularly occur if the tubes or conduits connecting the pressure chamber were small, as they generally are in practice. However, with a liquid trap in the system, the building of excess minus pressures (pressures less than atmospheric pressure) will cause the liquid in the neck 33 to flow into the vessel 32 and the system will be vented by air which bubbles up through such liquid, so that gasoline cannot possibly be drawn into the system. Moreover in the event of building up excess positive or plus pressures (pressures greater than atmospheric pressure), the liquid trap will serve as a safety valve and after the liquid in the trap has been forced into the vessel 34, the air in the system will bubble up through such liquid and be blown off. The trap therefore provides a safety valve as against both plus and minus pressures.

The drawings show the invention in its preferred, practical forms, but because of the wide adaptability of the invention, it is not limited to this illustrative showing, but is to be considered as fully commensurate with the appended claims.

Having thus fully described the invention, what I claim as new and desire to secure by Letters Patent is:

1. In a liquid level indicating system, a pressure cylinder adapted to be at least partially submerged in the liquid to be measured and provided at its bottom with an opening through which the liquid is free to flow into and out of the cylinder, a flexible U tube containing a liquid piston and one arm of which U tube is connected by a passage to the pressure cylinder, a dial, a pointer movable over the dial, means for moving the pointer over the dial and for simultaneously elevating one arm of the U tube to cause the liquid piston to rise in the other arm of the U tube and place the air in the pressure cylinder under pressure, means for indicating when the pressure in the pressure cylinder is substantially balanced with the hydrostatic pressure of the liquid to be measured, and a liquid valve communicating with the pressure cylinder and with the normally stationary arm of the U tube to relieve excess plus or minus pressures by the expulsion of air from or the admission of air into the system.

2. In a liquid level indicating system, a pressure cylinder adapted to be at least partially submerged in the liquid to be measured and provided at its bottom with an opening through which the liquid is free to flow into and out of the cylinder, a flexible U tube containing a liquid piston and one arm of which U tube is connected by a passage to the pressure cylinder, a dial, a pointer movable over the dial, means for moving the pointer over the dial and for simultaneously elevating one arm of the U tube to cause the liquid piston to rise in the other arm of the U tube and place the air in the pressure cylinder under pressure, means for indicating when the pressure in the pressure cylinder is substantially balanced with the hydrostatic pressure of the liquid to be measured, and a liquid valve communicating with the pressure cylinder and with the normally stationary arm of the U tube to relieve excess plus or minus pressures by the expulsion of air from or the admission of air into the system, said liquid valve embodying a reading column adapted to show approximately the quantity of liquid being measured.

3. In a system of the character described, a vessel containing a liquid, the level of which changes under variations in temperature due to the expansion or contraction of the liquid, a pressure cylinder partially submerged in said liquid, a flexible U tube, one end of which is normally fixed and the other end of which is mounted for up and down movement, said fixed end being connected by a closed conduit to the pressure cylinder and the U tube containing a liquid piston, means for elevating the movable end of the U tube to cause the liquid piston to flow toward the fixed end of the U tube for the purpose of placing the air in the conduit and pressure cylinder under pressure sufficient to balance the hydrostatic pressure of the liquid in the vessel, and indicating means for indicating such balanced condition, in terms of temperature.

4. In a system of the character described, a vessel containing a liquid, the level of which changes under variations in temperature due to the expansion or contraction of the liquid, a pressure cylinder partially submerged in said liquid, a flexible U tube, one end of which is normally fixed and the other end of which is mounted for up and down movement, said fixed end being connected by a closed conduit to the pressure cylinder and the U tube containing a liquid piston, means for elevating the movable end of the U tube to cause the liquid piston to flow toward the fixed end of the U tube for the purpose of placing the air in the conduit and pressure cylinder under pressure sufficient to balance the hydrostatic pressure of the liquid in the vessel, and indicating means for indicating such balanced condition, said indicating means embodying a signal showing when the balanced condition prevails and also comprising a scale graduated for temperatures.

5. An assembly of the character described embodying a tank adapted to contain liquid to be measured, a plurality of upright pressure cylinders arranged at different levels in the tank, the lower end of each cylinder being transversely juxtaposed with the upper end of the next lower cylinder, unitary indicating means, and means for placing the pressure cylinders selectively in communication with the indicating means.

6. An assembly of the character described embodying a tank adapted to contain liquid to be measured, a plurality of upright pressure cylinders arranged at different levels in the tank, the lower end of each cylinder being approximately juxtaposed with the upper end of the next lower cylinder, unitary indicating means, a conduit leading from each pressure cylinder to the unitary indicating means, and valvular means for placing the indicating means in communication with said pressure cylinders selectively.

7. In a liquid level indicating system, a pressure cylinder adapted to be at least partially submerged in the liquid to be measured and provided at its bottom with an opening through which the liquid is free to enter and leave the cylinder, a flexible U-tube containing a liquid piston and one arm of which U-tube is connected by a passage to the pressure cylinder, said passage having a valved vent to the atmosphere, means for lowering the arm of the U-tube which is not connected with the pressure cylinder to cause the liquid piston to descend in the other arm of the U-tube to suck in air through the valved vent to fill said passage with air, and for thereafter elevating said arm to place the air in the pressure cylinder under pressure equal to the hydrostatic pressure of the liquid to be measured, and indicating means operable by movement of the movable arm of the U-tube.

8. In a liquid level indicating system, a pressure cylinder adapted to be at least partially submerged in the liquid to be measured and provided at its bottom with an opening through which the liquid is free to enter and leave the cylinder, a flexible U tube containing a liquid piston and one arm of which U tube is connected by a passage to the pressure cylinder, said passage having a valved vent to the atmosphere, means for lowering the other arm of the U tube while the first mentioned arm remains stationary to suck in air through the valved vent to fill said passage with air, and for thereafter elevating said arm to cause the liquid to flow in a direction to place air in the pressure cylinder under pressure, a dial, a pointer mechanically connected to said means and movable over the dial as said arm of the U tube is elevated, whereby, when the pressure in the pressure cylinder and the hydrostatic pressure of the liquid to be measured are substantially balanced, a reading may be obtained by observing the dial and pointer.

9. In a liquid level indicating system, a pressure cylinder adapted to be at least partially submerged in the liquid to be measured, and provided at its bottom with an opening through which the liquid is free to flow into and out of the cylinder, a flexible U tube containing a liquid piston, and one arm of which U tube is connected by a passage to the pressure cylinder, a dial, a pointer movable over the dial, means mechanically connected to the pointer for lowering the other arm of the U tube to suck air through the valved vent to fill said passage with air, and for thereafter simultaneously moving the pointer over the dial and elevating the latter arm of the U tube to cause the liquid piston to rise in the first mentioned arm of said U tube and place the air in the pressure cylinder under pressure, and means for indicating when the pressure in the pressure cylinder is substantially balanced with the hydrostatic pressure of the liquid to be measured.

In testimony whereof, JACK D. SARTAKOFF, has signed his name to this specification this 24th day of June, 1926.

JACK D. SARTAKOFF.